United States Patent [19]

Bowman, Jr. et al.

[11] 4,088,977

[45] May 9, 1978

[54] CONTACTLESS LINEAR POSITION SENSOR

[75] Inventors: Joseph Henry Bowman, Jr., Oak Park; Rand Jeffery Eikelberger, Northfield; Arnold M. Miller, Schiller Park, all of Ill.

[73] Assignee: Illinois Tool Works Inc., Chicago, Ill.

[21] Appl. No.: 764,771

[22] Filed: Feb. 2, 1977

[51] Int. Cl.² .......................................... H01L 43/08
[52] U.S. Cl. ................... 338/32 R; 307/309; 323/94 H; 336/110; 338/32 H
[58] Field of Search ................. 338/32 R, 32 H, 32 S, 338/12, 68; 323/94 H; 336/110; 335/205, 206; 324/251, 252; 307/309; 365/137, 158

[56] References Cited

U.S. PATENT DOCUMENTS

| | | | |
|---|---|---|---|
| 3,331,045 | 7/1967 | Weiss et al. | 338/32 R |
| 3,335,384 | 8/1967 | Weiss | 338/68 |
| 3,671,854 | 6/1972 | Masuda | 323/94 H |
| 3,958,203 | 5/1976 | Bernin | 336/110 |
| 3,988,710 | 10/1976 | Sidor et al. | 338/32 R |

*Primary Examiner*—C. L. Albritton

*Attorney, Agent, or Firm*—Glenn W. Bowen; Robert W. Beart

[57] ABSTRACT

A contactless linear position sensor, or potentiometer, which has a linear output characteristic, is constructed with a pair of elongated, hollow cylindrical tubes which are made of magnetically saturable material and are aligned so that their axes form an angle of less than 180°, with both of said tubes having at least one conductive wire coupled therewith which is interconnected with the wire that is coupled with the other tube, and a moveable permanent magnet which is formed as a segment of a circular ring with a pair of straight sides that move adjacent to the tubes so that the total volume of the tubes that is magnetically saturated remains substantially constant while the inductance ratio of the tubes varies. The present invention is directed to a version of this type of contactless device which has improved temperature performance that is achieved by the use of a magnetically permeable pole piece positioned adjacent the moving magnet which is substantially the same shape as the magnet and the magnetically permeable flux enhancer which is positioned so that the tubes are located intermediate the flux enhancer and the moveable magnet.

10 Claims, 6 Drawing Figures

U.S. Patent May 9, 1978 4,088,977
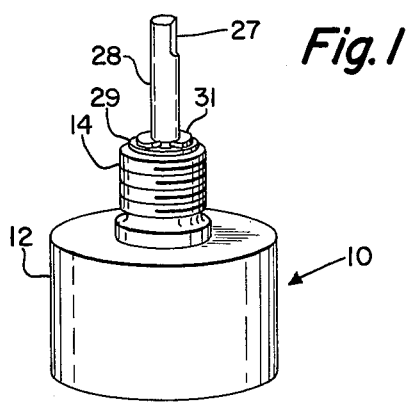
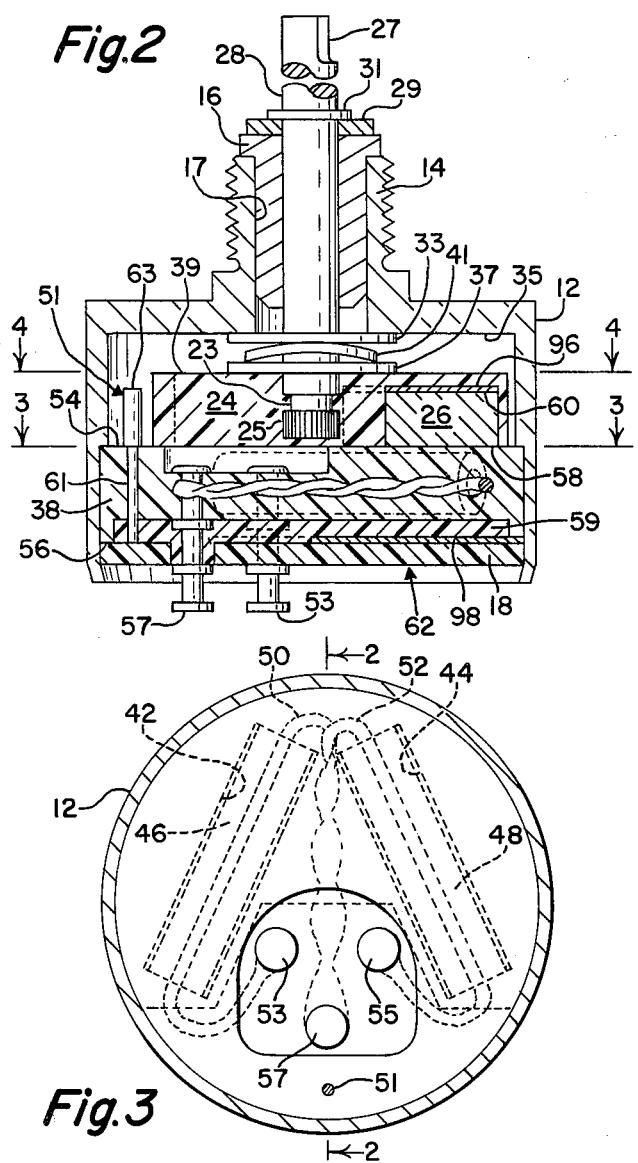
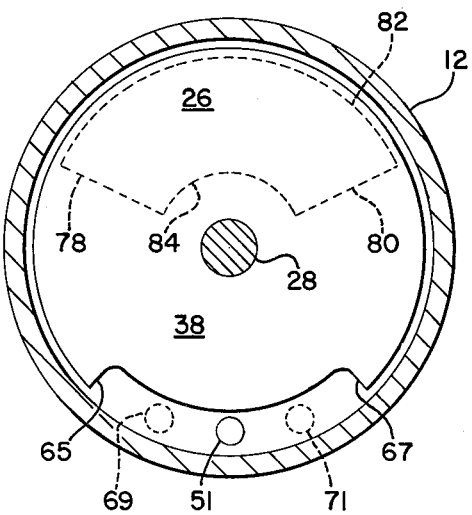
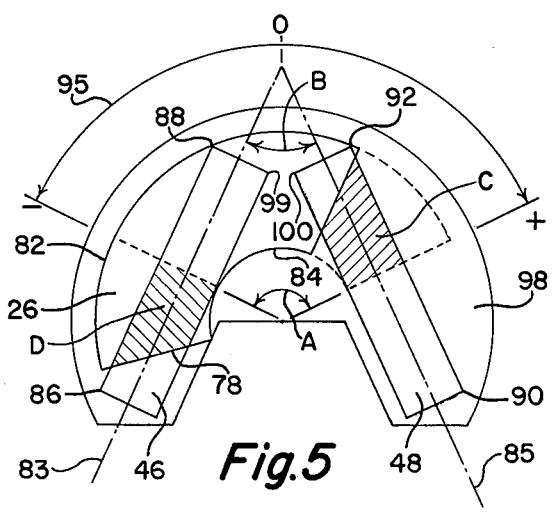
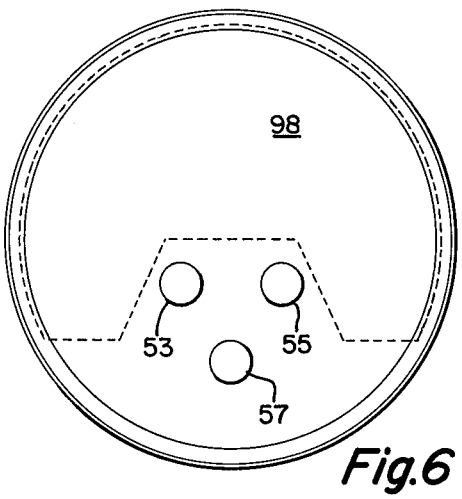

CONTACTLESS LINEAR POSITION SENSOR

BACKGROUND OF THE INVENTION

Various contactless rotary position sensors and potentiometers have been proposed for providing a linear output response. Contactless devices, of course, are advantageous over similar resistive-type devices because they have a considerably longer lifetime. Although contactless potentiometers which utilize a rotating permanent magnet section and a sensing element were previously known, these prove to have several decided disadvantages. The major disadvantages of such prior devices being that they generally required that the magnet or the sensing element, or both, be formed with a special precalculated shape in order to obtain the desired linearity. This obviously made these devices relatively costly to produce and, in addition, the shapes required could result in unduly increasing their size. Examples of such devices are shown in U.S. Pat. No. 3,335,384, which issued Aug. 8, 1967, to Herbert Weiss, and in U.S. Pat. No. 3,958,203, which issued May 18, 1976 in the name of Victor M. Bernin, and which is assigned to the assignee of the present invention.

U.S. Pat. No. 3,988,710, which issued Oct. 26, 1976, to Edward Frank Sidor and Frank B. Desio, and which was assigned to the assignee of the present invention, discloses a new type of contactless linear rotary position sensor, or potentiometer, which avoids the above noted deficiencies of other prior devices and which provides excellent linearity, is of relatively low cost and of relatively small size. In addition, the linear rotary devices of the Sidor and Desio patent has other decided advantages in that it is highly resistant to shock and vibrations and it is capable of operating over a temperature range of $-50°$ C to as high 200° C, or even higher, depending on the Curie point of the magnetic material that is employed.

It was found that the linear device of the Sidor and Desio patent, however, while possessing all of these excellent characteristics and while being capable of operating over a large temperature range and at high temperature, did exhibit an undesirable amount of temperature dependency for certain applications in that a plot of the output voltage vs. the degrees of rotation of the permanent magnet resulted in a graph that had a slope that varied appreciably as a function of the ambient temperature. For example, a plot of the output voltage vs. degrees of rotation of the magnet, while remaining linear for one sample over the entire temperature range from $-50°$ to 130° C, had a slope variation as a function of temperature that was found to be excessive for certain applications.

The present invention is directed to an improved version of the basic linear device of U.S. Pat. No. 3,988,710 in which the above described undesirable slope variation as a function of temperature is greatly reduced. For example, when the sample device mentioned above was provided with the improvement of the present invention the slope variation of the plot of the output voltage vs. degrees of rotation of the magnet was found to be substantially constant from 25° to 130° C, while the slope at $-50°$ C varied only slightly from that measured at 25° C. The sample device in question varied approximately 2.5 millivolts per degree of rotation of the magnet when it did not incorporate the improvement of the present invention, while the slope varied approximately only 1.0 millivolts per degree of rotation of the magnet over the same temperature range when the device was provided with the improvement of the present invention. It is seen, therefore, that the improvement of the present invention substantially reduces the temperature dependency of a sensor constructed in accordance with U.S. Pat. No. 3,988,710 over the operating temperature range of such a device.

DESCRIPTION OF THE DRAWINGS

The present invention is described herein by reference to the drawings in which:

FIG. 1 is a perspective view of the improved contactless device of the present invention;

FIG. 2 is a cross-sectional view of the device of FIG. 1 taken along the Line 2—2 of FIG. 3;

FIG. 3 is a cross-sectional view of the device of FIGS. 1 and 2 taken along the Lines 3—3 of FIG. 2, which shows the hidden pole piece in dotted line form;

FIG. 4 is a cross-sectional view of the device of FIGS. 1 and 2 taken along Lines 4—4 of FIG. 2;

FIG. 5 is a diagrammatic illustration which shows the relationship between the shapes of the rotatable permanent magnet, the adjacent pole piece, the flux enhancer and the sensing elements; and FIG. 6 is a bottom view of FIG. 2 which shows the flux enhancer in dotted line form since it actually is hidden from view by the bottom closure plate.

TECHNICAL DESCRIPTION OF THE INVENTION

The present invention is an improved version of the contactless linear rotary potentiometer, or position sensor, that is shown and described in U.S. Pat. No. 3,988,710, which issued Oct. 26, 1976 in the names of Edward Frank Sidor and Frank B. Desio, and which is assigned to the assignee of the present invention. While the construction details of the linear device described herein are somewhat different from those of the Sidor and Desio patent, the present invention is equally applicable to both, and the contents of U.S. Pat. No. 3,988,710 are, therefore, hereby incorporated by reference herein. The device of the present invention is shown in perspective view in FIG. 1.

The potentiometer, or linear position sensor 10, is formed with a housing 12 which has a threaded stem integrally formed thereon, a bushing 16 in the integral opening 17 that runs through the stem and a lower housing enclosure 18 of electrically insulating material which closes off the bottom of the housing.

A disc-shaped rotor 24 of electrically insulating molded plastic material has a permanent magnet 26, preferably of the ceramic type, which is shaped as shown in FIGS. 4 and 5, molded into it. The vertical actuating shaft 28 has a knurled disc 25 below the reduced diameter section 23 which is molded into the rotor so that the rotor and the magnet may rotate as a unit with the shaft. The shaft 28 may also be provided with a cut-out segment at its upper end which points toward the magnet 26 to assist in properly orienting the shaft initially.

The shaft 28 is secured and held in place in the stem 14 by means of the retaining ring 31 above the washer 29, which engages the upper surface of the bushing 16, the washer 33 which is positioned against the surface 35 of the housing 12, the washer 37 which is positioned against the upper surface 39 of the rotor 24 and the bowed retaining ring 41, which provides the necessary bias to force the washers 33 and 37 against the surface 35 and 39, respectively. The particular manner, however, by which the shaft 28 is secured to the rotor 24 is not essential with respect to the present invention.

A disc-shaped spacer 38 of electrically insulating material is positioned below the rotor 24 and it is secured to the housing so that it will not rotate when the shaft 28 is rotated. The spacer 38 retains both of the elongated sensing elements 46, 48, each of which are placed into one of the elongated rectangular shaped slots 42, 44 in the spacer 38. Sensing elements 46, 48 are preferably hollow elongated cylindrical tubes that are made of magnetically permeable material and have conductive sensing wires 50, 52 running respectively therethrough so as to form two inductive elements. The slots 42, 44 are preferably deep enough so that when the elements 46, 48 are inserted into them the peripheries of the elements lie wholly within the surfaces 54, 56 of the spacer 38 so as to enable the lower face 58 of the magnet to pass directly over the slots 42, 44 without contacting the elements 46, 48.

One end of each of the wires 50, 52 is connected to the contact terminal 53, or 55, while the opposite ends of these wires are both connected to the common terminal 57. In the embodiment shown in FIG. 3, the wires 50, 52 are wound around each other so as to minimize interference pick-up. In this case, the wires are provided with an insulated covering. However, the manner in which electrical connections are made to the terminals 53, 55 and 57 is not of importance with respect to the present invention, and the wires 50, 52 may, therefore, be insulated or non-insulated in accordance with the desired application and construction. An electrically insulating material is used to fill the recess 59 so as to cover the slots 42, 44, which face downward, as shown in FIG. 2, to hold the sensing elements 46, 48 in place in the slots. The electrically insulating material may be a plastic material which is poured in liquid form into the recess and over the sensing elements 46, 48, which later hardens.

The permanent magnet 26 is magnetized so that its lower face 58 is of one magnetic polarity while its upper face 60 is of the opposite magnetic polarity. The potentiometer, or position sensor 10, is assembled as best shown in FIG. 2. The bottom closure plate 18 of electrical insulating material is held in place by a reduction in the diameter of the lowermost portion 62 of the housing 12.

While it is preferred that the sensing elements 46, 48 be constructed as described, it is apparent that these elements do not have to be in the form of a hollow cylindrical tube and may ultimately assume other forms, including a solid cylindrical shape or a solid or hollow rectangular shape, all of which are easily produced, and all of which form a substantially rectangular projection in the plane parallel to the surfaces 54, 56 of the spacer 38. In addition, while a magnetic saturable ferrite material is preferred for the sensing elements, it is apparent that they may comprise various other elements, including Hall-effect, magneto-resistive, galvano-magnetic semiconductor, transformer coupled (which can be achieved with the disclosed embodiment merely by adding an additional current-carrying conductive wire through each of the elements 46, 48 to act as a drive wire, with the wires 50 and 52 still assuming the function of sense wires), and wound coil devices; providing the selected device is capable of being incrementally affected so as to produce an output signal that varies in direct correspondence with the rotation of an adjacent permanent magnet which has two substantially straight sides, such as the magnet 26 of FIGS. 4 and 5, which is formed as a segment of a circular ring.

FIG. 5 shows the relationship between the shape of the elongated cylindrical or rectangular shaped elements 46 and 48 and the permanent magnet 26. The most convenient way in which the magnet 26 may be formed is as a segment of a circular ring, as shown in FIGS. 4 and 5, although the shape of the curved outer edge 82 and the curved inner edge 84 is not important with respect to the operation of the device. The sides 78, 80 of the magnet 26 are preferably substantially straight so as to provide the desired linearity. The angle A that is made by extending the sides 78, 80 is shown in FIG. 5. The angle A faces the angle B which is less than 180° and is formed by the intersection of the longitudinal axes 83, 85 of the elements 46, 48, as also shown in FIG. 5. The angle A is also less than 180° and is further limited so that the sides 78 cannot pass beyond the edges 86, 88 of the element 46, nor can the side 80 pass beyond the edges 90, 92 of the element 48 over the full range of rotation of the magnet 26. The edges 99, 100 of the elements 46, 48, respectively, are positioned so that they almost touch each other in order to allow the longitudinal axes 83, 85 of the elements 46, 48 to form the angle B within a minimal space. The sides 78, 80 of the magnet 26 thus intersect the axis 83, 85 of the elements 46 and 48, respectively.

Then magnitude of the angle B thus formed by the elongated axes 83, 85 of the elements 46, 48 influences the size of the device and the allowable range of rotation of the rotor. An angle B of approximately 50°, as shown in FIG. 5, is acceptable to accommodate both size and rotation requirements for many applications wherein the magnet 26 is configurated as shown in FIG. 5. Up to a maximum of approximately 65° of rotation of the rotor 24 to either side of the center line O is thus allowable in this case with the angle A correspondingly being 130°.

In the illustrated embodiment, the stop post 51 is located in alignment with the shaft 28 and with the contact terminal 57. With the stop post 51 thus located, a magnet rotation of approximately 42.5° to either side of the center line O is allowable. The stop post 51 is constructed to have a small diameter lower portion 61 that is held in place by the solidified plastic compound in the recess 59, as previously mentioned, and a larger diameter upper portion 63 which provides the stopping, or limiting, surface. The upper portion 63 of the post 51 interacts with the surfaces 65 and 67 of the rotor 24, according to whether the spacer is rotated in a clockwise or counter clockwise direction, to limit the rotation of the rotor 24 and the magnet 26 to approximately 42.5° of rotation in either direction. If a still greater limitation of the amount of rotation of the rotor 24 is desired, the stop posts 69, 71, the positions of which are shown in dotted line form in FIG. 4, may be substituted for the post 51 to limit the rotation of the rotor 24 and the magnet 26 to approximately 22.5° of rotation in either direction from the center line O.

In operation, the magnet 26 extends over the sensing elements 46, 48 so that the total volume of the sensing elements which are magnetically saturated preferably so that substantially complete magnetic staturation occurs, whereby an increase in magnetic field strength will not produce any substantially further decrease in the inductance of the elements 46, 48) remains constant. Thus, when the magnet 26 is positioned in a central position, as indicated by the dotted lines in FIG. 5, the volumes of each of the elements 46, 48 that are saturated will be approximately equal. When the magnet 26 is rotated to a position as shown by the full lines of FIG. 5, the decrease in volume of the element 48 that is saturated, which is the portion labelled "C" in FIG. 5, will be approximately equal to the increase in volume of the element 46 that is saturated, which is the portion labelled "D" in FIG. 5. At positions between the full and dotted line positions shown in FIG. 5, the increase of the volume that is saturated of one element is correspondingly balanced by the decrease of the volume that is saturated of the other element.

The terminals 53, 55 and 57 may be coupled into a conventional differential sensing circuit in order to provide a circuit that produces an output signal which is representative of the location of the magnet 26 with respect to the center line O, in either a "positive" or a "negative" direction, according to whether magnet 26 is undergoing a clockwise or a counter clockwise rotation, as indicated by double headed arrow 95 of FIG. 5.

The improved linear sensor, or potentiometer, of the present invention is capable of operating over a temperature range from −50° to 200° C, or more, with only a small change in the slope of the plot of the output voltage vs. degrees of rotation of the permanent magnet over this temperature range. For example, a typical sensor of the type described herein without the provisions of the present invention has a high temperature slope of approximately 8.4 millivolts per degree of rotation with a percentage slope change of approximately 32% over a temperature range from −60° to 257° F. However, when provided with the construction of the present invention, the device exhibited a high temperature slope of approximately 8.3 millivolts per degree of rotation with a percentage slope change of approximately only 9% over the same temperature range. Thus, the construction of the present invention greatly reduces the effects of ambient temperature changes on the output signal from the sensor, or potentiometer.

The improvement of the present invention is achieved in part by the addition of a first thin sheet, preferably on the order of 0.010 inch thick, of magnetically permeable cold rolled steel which acts as a pole piece 96 and which is attached to the upper face 60 of the permanent magnet 26. The pole piece 96 preferably conforms in shape to the shape of the magnet 26. The other element of the improvement of the present invention is a second thin sheet, preferably on the order of 0.010 inch thick, of magnetically permeable cold rolled steel, which acts as a flux enhancer 98. The flux enhancer 98 is preferably shaped as shown in FIG. 6 so as to enclose the sensing elements 46, 48 and the magnet 26 completely within its boundary. The sensing elements 46, 48 are thus located intermediate the flux enhancer 98 and the lower face 58 of the magnet 26.

The improved temperature performance that results in this type of device due to the addition of the pole piece 96 and the flux enhancer 98 is believed to be due to the fact that these two elements tend to strengthen the magnetic field that acts on sense elements 46, 48, thereby driving them into saturation more completely toward their saturation limit. The slope of the angle of the output voltage vs. degrees of rotation is a function of the degree of magnetic saturation of the sensing elements and, therefore, when the elements are driven further into saturation, the slope of this plot is decreased as desired.

It will be apparent to those skilled in the art that a variety of embodiments may be devised within the scope of the appended claims which will be obvious in view of the embodiment described herein and these variations are intended to be encompassed within the scope of the claimed invention.

What is claimed is:

1. In a rotary contactless device comprising first and second elongated sensing elements, each of which has a substantially straight longitudinal axis and is shaped to form a rectangular projection in a plane, said sensing elements being positioned so that said elongated axes intersect to form a first angle which is less than 180°, at least one permanent magnet positioned adjacent said sensing elements, rotation means coupled to said permanent magnet to provide for the rotation thereof and limit means constructed to limit the range of rotation of said permanent magnet by said rotation means relative to said sensing elements, said permanent magnet being shaped to have first and second substantially straight sides each of which pass adjacent one of said rectangular projections so as to intersect the associated longitudinal axis of said sensing elements, said sides lying along said lines that intersect to form a second angle that faces said first angle and is less than 180° and is further limited so that neither of said sides can pass beyond the outer edges of the respective projection adjacent said side over the limited range of rotation of said permanent magnet that is allowed by said limit means, and so that the total area of said projections that are positioned adjacent said permanent magnet is substantially constant regardless of the relative position of said permanent magnet and said sensing elements within said limited range of rotation, the improvement comprising a pole piece of magnetically permeable material adjacent to and rotatable with said permanent magnet and a flux enhancer means of magnetically permeable material located adjacent said sensing elements so that said sensing elements are positioned intermediate said pole piece and said flux enhancing means.

2. In a rotary contactless device as claimed in claim 1, the improvement wherein said pole piece has a shape that conforms substantially to the shape of said magnet.

3. In a rotary contactless device as claimed in claim 1, the improvement wherein said flux enhancing means is shaped so that said sensing elements lie completely within the boundary of said flux enhancing means.

4. In a rotary contactless device as claimed in claim 1, the improvement wherein said permanent magnet is positioned intermediate said pole piece and said sensing elements.

5. In a rotary contactless device as claimed in claim 3, the improvement wherein said pole piece has a shape that conforms substantially to the shape of said magnet.

6. In a rotary contactless device as claimed in claim 5, the improvement wherein said permanent magnet is positioned intermediate said pole piece and said sensing elements.

7. In a rotary contactless device as claimed in claim 2, the improvement wherein the said pole piece is constructed of a thin sheet of steel on the order of 0.01 inch thick.

8. In a rotary contactless device as claimed in claim 3, the improvement wherein said flux enhancing means is constructed of a thin sheet of steel on the order of 0.010 inch thick.

9. In a rotary contactless device as claimed in claim 5, the improvement wherein both said pole piece and said flux enhancing means are constructed of thin sheets of steel on the order of 0.010 inch thick.

10. In a rotary contactless device as claimed in claim 9, the improvement wherein said permanent magnet is positioned intermediate said pole piece and said sensing elements.

* * * * *